(No Model.) 9 Sheets—Sheet 1.

P. F. COX.
TYPE DISTRIBUTING MACHINE.

No. 550,553. Patented Nov. 26, 1895.

Fig. 1.

WITNESSES
Jos. C. Stack.
James R. Mansfield.

INVENTOR
Paul F. Cox.
Per Alexander Howell
Attorneys.

(No Model.) 9 Sheets—Sheet 3.

P. F. COX.
TYPE DISTRIBUTING MACHINE.

No. 550,553. Patented Nov. 26, 1895.

WITNESSES
Jos. C. Stack.
James R. Mansfield.

INVENTOR
Paul F. Cox.
Per Alexander F. Dowell
Attorneys.

(No Model.) 9 Sheets—Sheet 5.

P. F. COX.
TYPE DISTRIBUTING MACHINE.

No. 550,553. Patented Nov. 26, 1895.

WITNESSES
Jos. C. Stack.
James R. Mansfield.

INVENTOR
Paul F. Cox.
Per Alexander Powell
Attorneys.

(No Model.) 9 Sheets—Sheet 7.
P. F. COX.
TYPE DISTRIBUTING MACHINE.
No. 550,553. Patented Nov. 26, 1895.

WITNESSES
Jos. C. Stack.
James R. Mansfield.

INVENTOR
Paul F. Cox.
Per Alexander Howell
Attorneys.

(No Model.) 9 Sheets—Sheet 8.

P. F. COX.
TYPE DISTRIBUTING MACHINE.

No. 550,553. Patented Nov. 26, 1895.

WITNESSES
Jos. C. Stack.
James R. Mansfield

INVENTOR
Paul F. Cox.
Alexander Howell
Attorneys

(No Model.) 9 Sheets—Sheet 9.

P. F. COX.
TYPE DISTRIBUTING MACHINE.

No. 550,553. Patented Nov. 26, 1895.

WITNESSES
Jos. C. Stack.
James R. Mansfield.

INVENTOR
Paul F. Cox.
Per Alexander Howell
Attorneys.

UNITED STATES PATENT OFFICE.

PAUL FLEMMING COX, OF CHICAGO, ILLINOIS, ASSIGNOR TO THE COX TYPE SETTING MACHINE COMPANY, OF SAME PLACE.

TYPE-DISTRIBUTING MACHINE.

SPECIFICATION forming part of Letters Patent No. 550,553, dated November 26, 1895.

Application filed June 13, 1895. Serial No. 552,688. (No model.)

*To all whom it may concern:*

Be it known that I, PAUL FLEMMING COX, of Chicago, in the county of Cook and State of Illinois, have invented certain new and useful Improvements in Type-Distributing Machines; and I do hereby declare that the following is a full, clear, and exact description thereof, reference being had to the accompanying drawings, and to the letters of reference marked thereon, which form part of this specification.

This invention is an improved apparatus for distributing type, and comprises means for removing the leads from the "dead matter" prior to distribution of the type, means for removing the spaces from the type prior to distribution, means for filling the distributer-cylinder with type for distribution without stopping the distributing process, and means for collecting the distributed type into removable receivers.

The lead and space discarding mechanism takes the dead matter from the galley and separates the type from the "spaces" and "leads" (and the spaces from the leads also) and delivers the type to the distributer-channels in the best condition for rapid distribution. The discarding and distributing mechanisms are so arranged and constructed, however, that they can operate synchronously or independently, enabling one operator to attend to the apparatus without difficulty, and means are provided whereby danger of breakage from misplaced types, &c., is prevented.

The test-plates of the distributer revolve, together with the removable type-receivers and plungers, by which the types delivered from the distributer are loaded into the receivers; but the cylinder in which the type to be distributed is contained is normally stationary in relation to the test-plates during the distributing operation. Above the cylinder and fixed thereto is a loading-case provided with a series of hinged type-line cases, which are lowered to receive a line of type from the discarder and then raised to enable the type to be delivered into the corresponding channel of the cylinder. Thus the cylinder and case are rotatable to enable any one of the type-line cases to be brought into register with the discarder, and when so adjusted the cylinder and case are locked and become stationary relatively to the test-plates. The cylinder and loading-case could be made in one piece, but are made separately for convenience in construction.

By discarding the spaces the distribution of the type is greatly facilitated, and my distributer is especially adapted for use in connection with machines using compressible spaces, such as are shown in my patent, No. 534,550, dated February 19, 1895, for example.

The machine illustrated in the accompanying drawings, and referred to hereinafter by letters of reference marked thereon, embodies my invention and is the best form of apparatus now known to me; but I do not consider my invention limited to the peculiar construction thereof, the invention being best disclosed in the claims hereunto annexed.

In said drawings.

Figure 1:
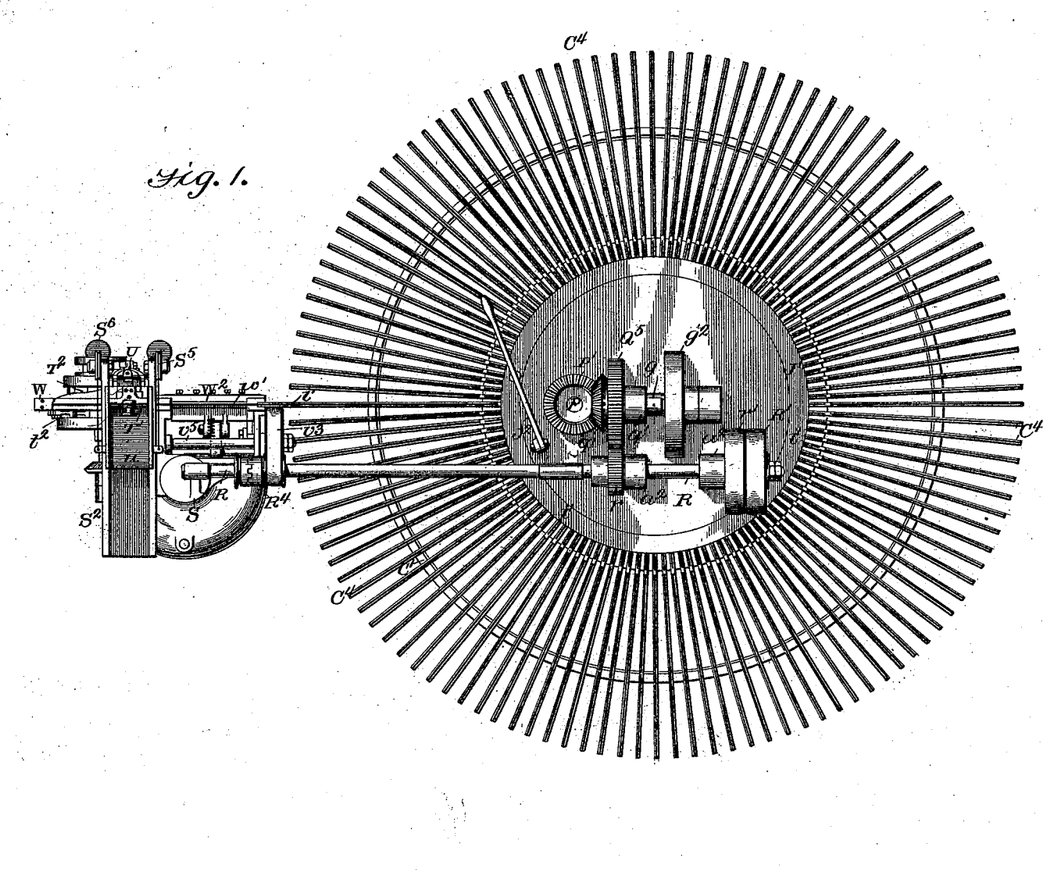
Figure 1 is a top plan view of the complete machine for discarding spaces and leads from dead matter and distributing the type.
Figure 2:
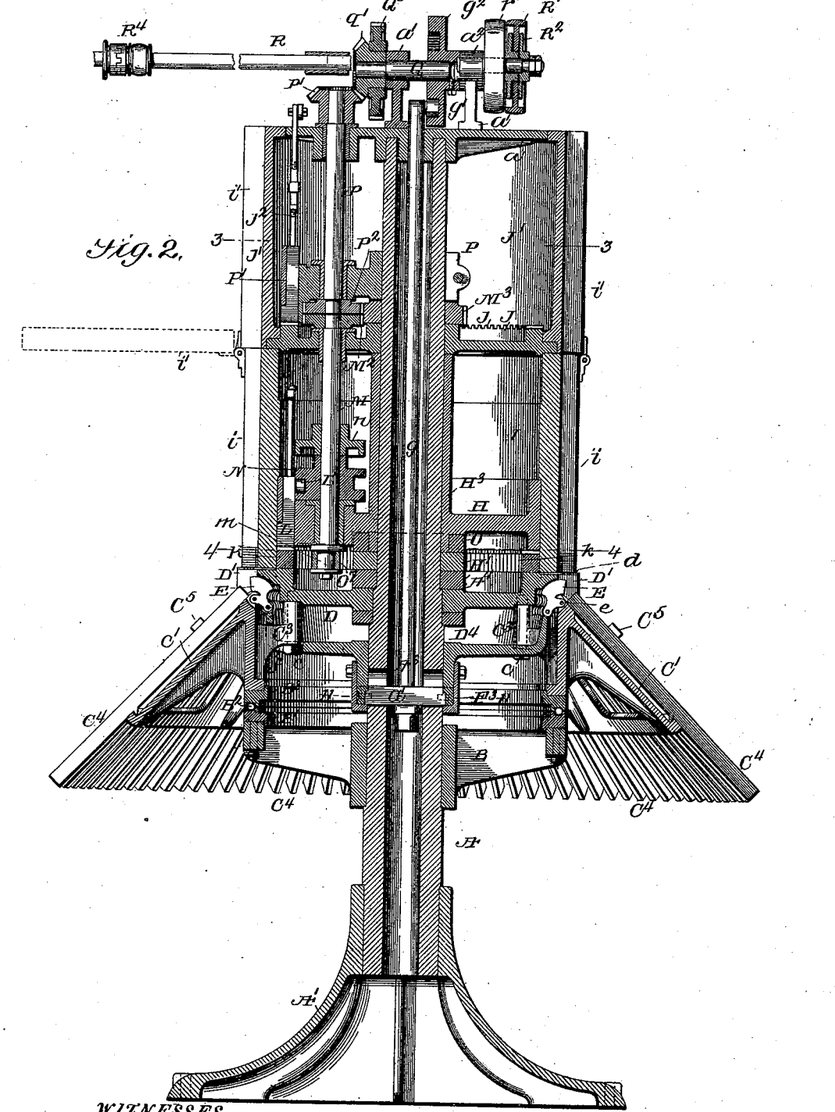
Fig. 2 is a central vertical section on the plane indicated by dotted line 2 2, Fig. 3, the barrel I having been rotated until shaft M comes into line with shaft $p$.
Figure 3:
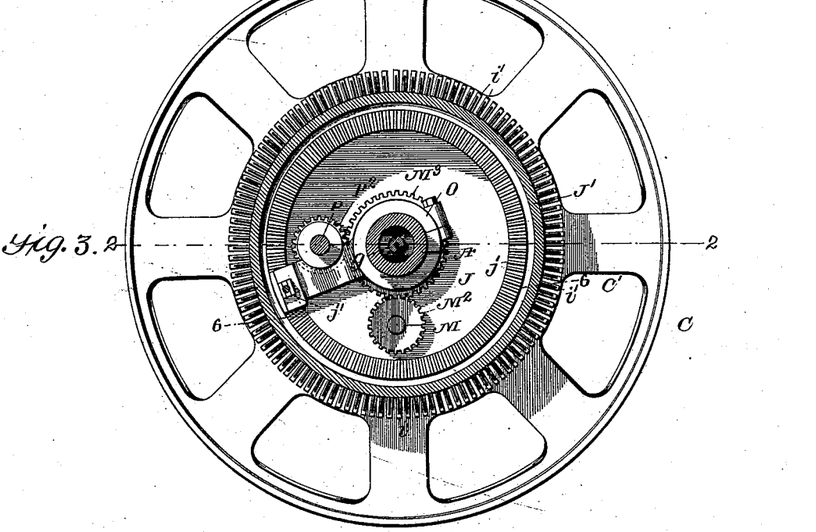
Fig. 3 is a horizontal transverse section on line 3 3, Fig. 2.
Figure 4:
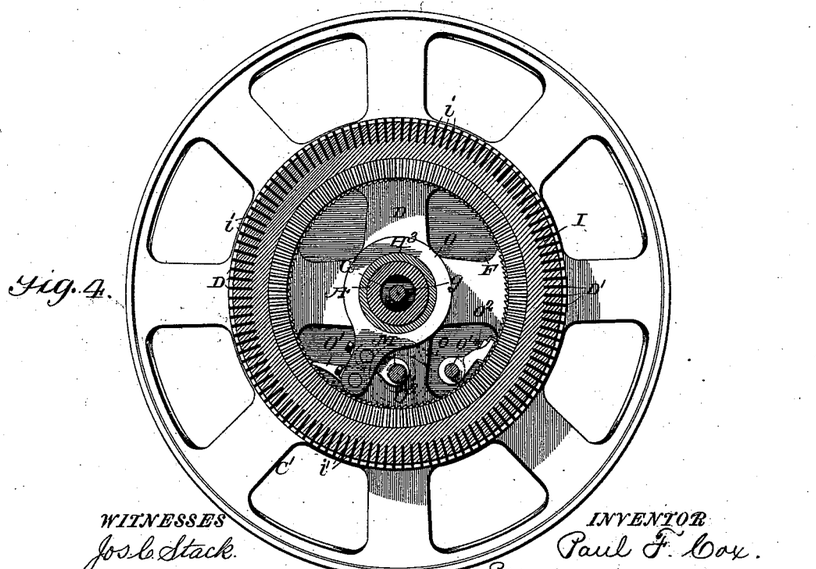
Fig. 4 is a similar section on line 4 4, Fig. 2.
Figures 5, 6:
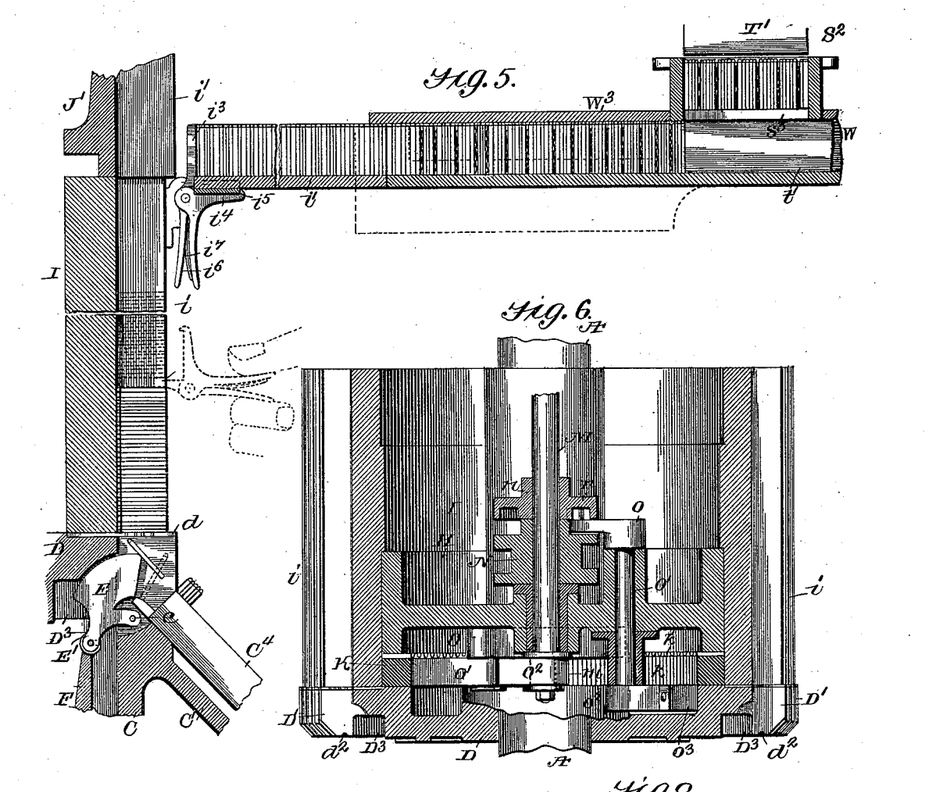
Fig. 5 is a diagrammatical sectional view illustrating the passage of type from the dead-matter galley through the discarder and distributer.
Fig. 6 is a vertical sectional view, enlarged, on line 6 6, Fig. 3.
Figure 7:
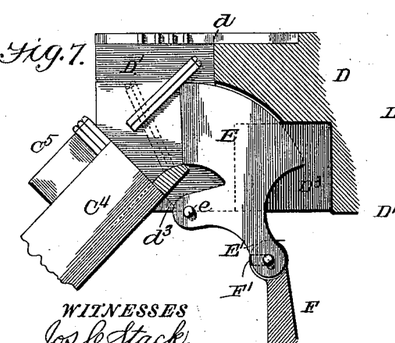
Fig. 7 is an enlarged detail of the test-plate disk type holders and pushers.
Figure 8:
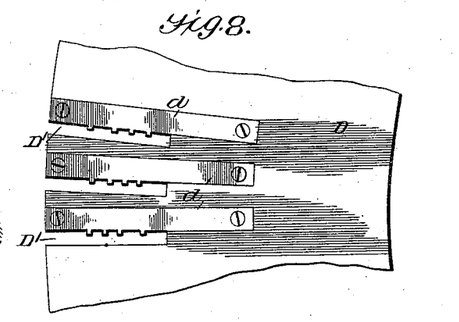
Fig. 8 is a detail plan of part of the test-plate disk.
Figure 9:
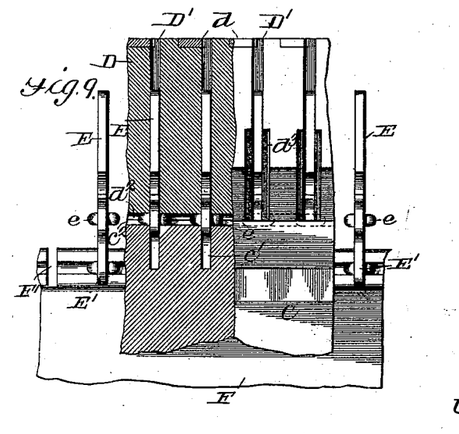
Fig. 9 is a detail edge view, partly in section, of the test-plate disk, pushers, and pusher-actuating plate.
Figure 10:
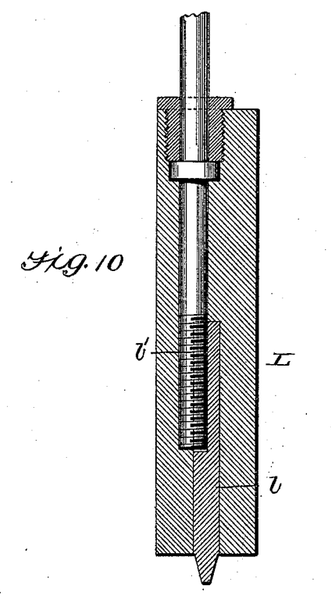
Fig. 10 is a detail section of the adjustable latch L.
Figure 11:
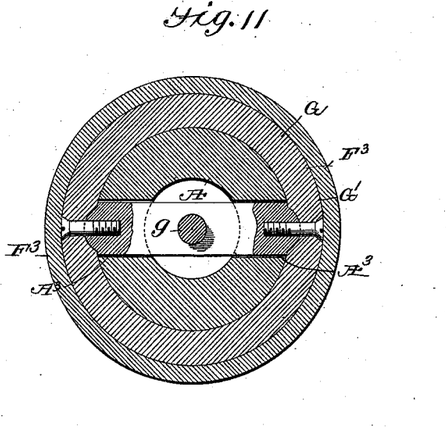
Fig. 11 is a detail section on line 11 11, Fig. 2.
Figures 12, 24:
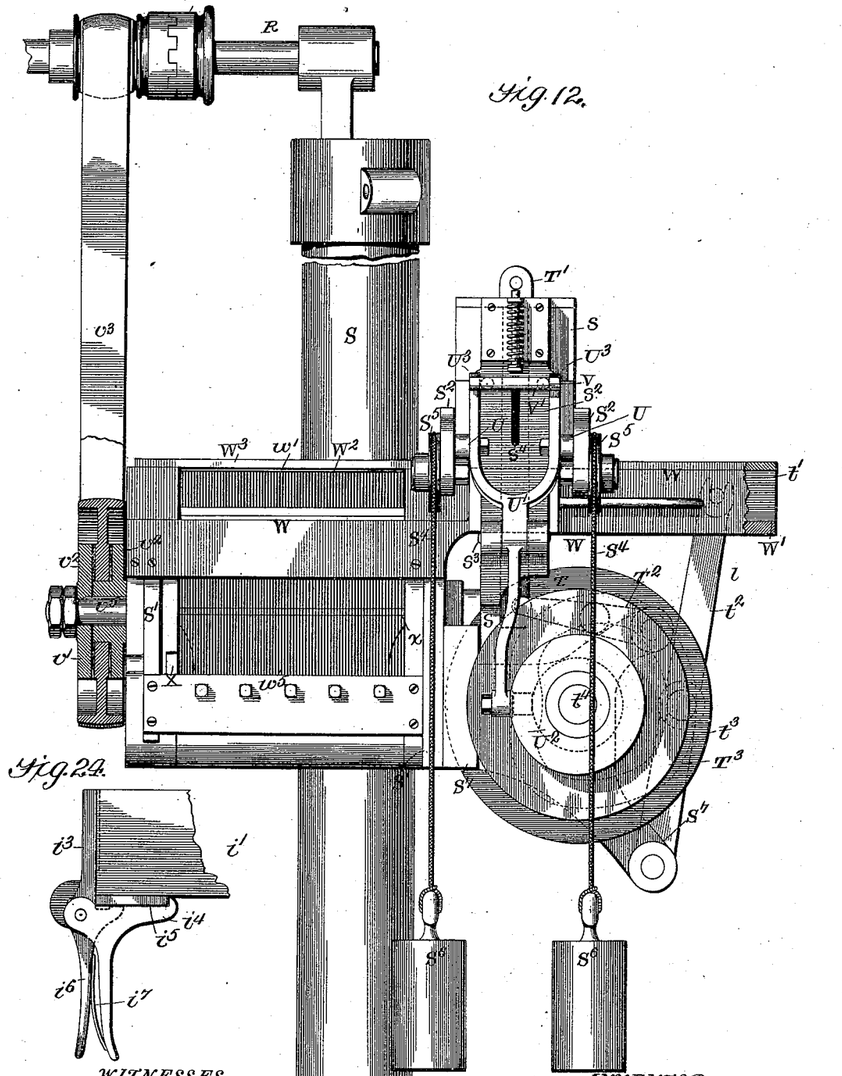
Fig. 12 is a rear elevation, enlarged, of the space and lead discarding mechanism.
Fig. 24 is a detail view of the false bottom for the hinged line-case.
Figure 13:
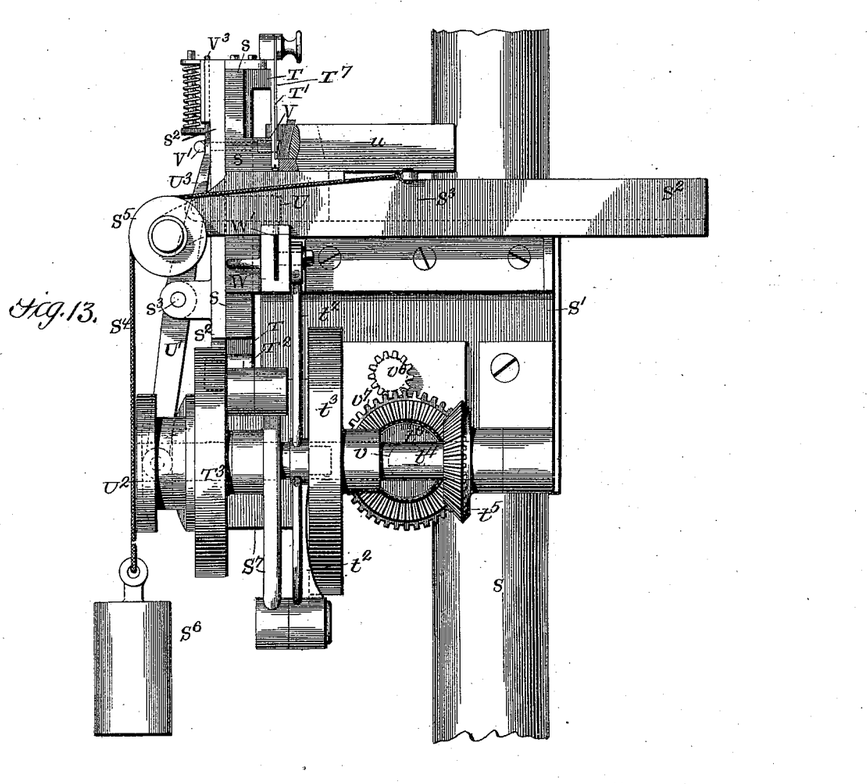
Fig. 13 is an outer end view thereof.
Figure 14:
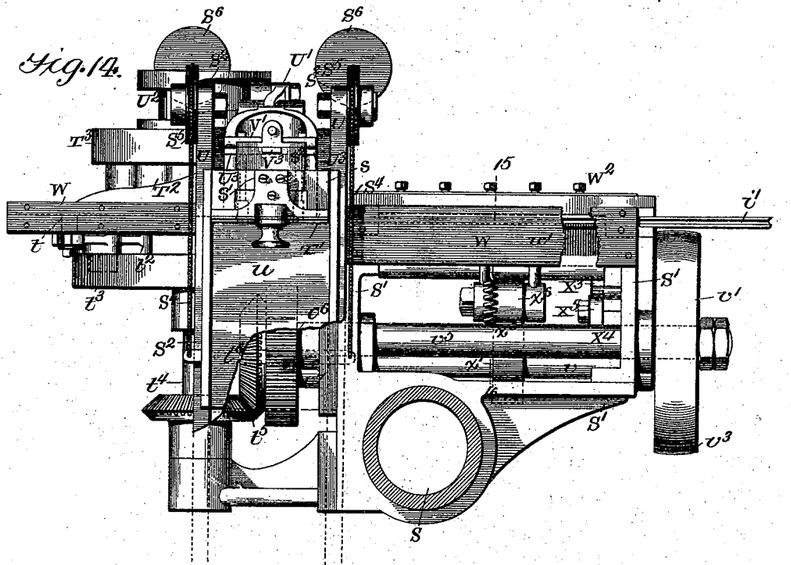
Fig. 14 is a top plan view thereof.

The operative parts of the distributer are mounted upon an upright hollow standard A, which is supported on a base A'. Upon standard A just above the base is fixed a spider B, on the rim of which is mounted an annulus B', provided with an annular groove for the reception of ball-bearings B², which support another annulus B³, on which is supported an annular casting C, (see Fig. 3,) having a downwardly-flaring skirt-flange C', forming a support for the distributed-type-line receivers hereinafter described. Above annulus C and partly supported thereon is a disk D, which has a series of slots D' in its edge, over which are fitted test-plates d. Disk D is principally supported on a collar D⁴ on standard A, and it is fastened to casting C by means of screw c, tapped through inwardly-projecting brackets C³ on said castings, as shown in Fig. 1. In the under surface of disk D, to the inner side of slots D', is an annular channel D³, into which each slot D' opens, and in the upper edge of annulus C, just below slots D', are inwardly-inclined slots c'. In each slot D' is a type-pusher E, which is pivoted by lugs e, resting in shallow channels c² at each side of slots c' and confined therein by shallow channels d² on the bottom of disk D at each side of each channel. Practically channels c² are parts of a continuous groove in annulus C and channels d² parts of a continuous groove in disk D. These pushers are provided with depensions E', pivotally connected to the outer edge of a rising and falling plate F, centered on standard A below collar D⁴ and within annulus C, the edge of the plate being upturned and channeled and slotted, as at F', for engagement with depensions E' of pushers E.

Plate F has openings f through it to accommodate brackets C³ and screws c, and it rests on a ring G, loosely fitted on standard A, and fastened to a bar G', that passes through slots A³ in the standard. A lipped sleeve F³, fastened to the limb of plate F, confines it to ring G, as shown. Bar G' is connected to the lower end of a rod g, which passes up through the standard and through a guide-opening in the top plate a and has a roller g' on its upper end engaging a cam-groove in a cam-wheel g² on a shaft Q, journaled in bearings on said top plate. By this means parts C D E F can rotate around the shaft, and at the same time the pushers be simultaneously reciprocated by the rising and falling of plate F.

Just above disk D a collar A⁴ is mounted on standard A, and on this collar is supported a rotatable collar H' on the lower end of the hub H³ of a wheel-shaped head H, fitted in the lower end of and supporting the channeled type-holder I, which is a hollow cylinder having a series of vertical channels i in its outer face, (one for each slot D',) each adapted to contain a line of type to be distributed. This holder fits closely over, but does not rest on, disk D.

The upper end of holder I is closed by a head J, loosely fitted on standard A and supported on the upper end of the hub H³ of head H, as shown. Below head H, fitted neatly within holder I and secured on top of disk D, is an annulus K, formed with ratchet-teeth k on its inner periphery, one for each slot D' and channel i, and a series of radial registering slots k' on its upper face, one for each slot D' and channel i, the slots k' being engaged by a vertically-movable dog L, playing in a vertical slot h in head H, (operated as hereinafter described,) adapted to lock the holder and disk together, so that channels i and slots D' exactly register.

Disk D is rotated by the following means: A vertical shaft M is journaled in and between heads H and J, suitable bushed openings being formed in said heads for this purpose. A pinion M² is fixed on the upper end of shaft M just above head J, and a race-cam N is pinned on the shaft just above head H. A friction-roller L', attached to the bolt L, engages the race in cam N, and said cam raises and lowers said bolt once for every revolution of shaft M. Bolt L has an adjustable tooth l, whose position or projection can be regulated by the screw l'. Above collar H' and loosely fitted around the hub of head H is an arm O, to which is pivoted a dog O', engaging the ratchet-teeth k of annulus K, and said arm is connected by a link O² with the eccentric-pin m on the lower end of shaft M, so that the disk D is actuated by said shaft. On shaft M, above cam N, is a cam n, having a one-lobed cam-groove in its lower face engaged by an arm o on the upper end of a stub-shaft o', journaled in an opening in head H, and on the lower end of shaft o' is a brake-arm o², having a brake-shoe o³ on its outer end, adapted to press against the inner face of the upstanding rim of disk D, as indicated in the drawings, and stop the rotation thereof.

The top plate a is fast on the upper end of standard A and closes the upper end of a hollow cylinder J', superimposed on head J directly over holder I. Within this cylinder, just above head J, is a gear M³, loosely journaled on standard A and meshing with pinion M², and rigidly fastened to the standard, above gear M³, is a bracket P, in which is journaled the lower end of a vertical shaft p, the upper end of which is journaled in and passes through plate a, and on its upper end is a bevel-gear p' and on its lower end a pinion p², meshing with gear M³. Gear p' meshes with a bevel-gear q' on a short horizontal shaft Q, journaled in brackets a', fixed to plate a, said shaft carrying cam g² also.

On the upper side of head J is an annular rack j, which is engaged by a bolt j', playing through a slot P' in the outer end of bracket P. The bolt is connected to the lower end of an extensible rod j², which extends through an opening in plate a and is attached to a hand-lever $j^3$, by which the bolt can be released or engaged with the rack $j$ at will.

A shaft R is journaled in brackets $a^2$ on plate $a$ parallel with shaft Q, and has a pinion $r$ meshing with gear $Q^5$ to impart motion to shaft Q. Shaft R is driven by a pulley R', which is loosely mounted on the shaft beside an idler-pulley $r'$, but is clamped between two friction-plates $R^2$, fixed on the shaft and constituting a friction-clutch, which will ordinarily be sufficiently tight to cause pulley R' to drive the machine, but will allow the pulley to slip if by accident a type should be caught between a moving and stationary part of the mechanism, or other like abnormal condition of things arise. Shaft R is also utilized to drive the space-discarding mechanism and is provided with a clutch-coupling $R^4$, so that, if desired, the latter mechanism can be stopped while the distributer continues to operate.

At the top of each channel $i$ is a hinged line-case $i'$, which forms a continuation of the channel when it is set up in vertical position, as indicated in full lines, Fig. 1. These cases are, however, turned down at right angles to the channels $i$, as shown in dotted lines, Fig. 1, to receive a line of type to be distributed, and are then turned up against barrel J' and locked in upright position. The inner or lower ends of cases $i'$ are closed by a false bottom $i^3$, having a projecting handle $i^6$, to which is pivoted a catch $i^4$, that engages a lug $i^5$ on the end of case, said handle being forced apart by a spring $i^7$, as shown, so that the bottom can be readily locked in place. After the case $i'$ is turned up, with the vertical line of dead matter contained therein standing perpendicularly over a channel $i$ of the distributing-cylinder, the operator pinches the finger-and-thumb lever $i^6$ $i^4$, releasing the bottom from the lower extremity of the right-hinged case $i$, and then he gradually lowers said false bottom and the type therein down into the channel of the distributing-cylinder until he reaches the top of what type-column may be left in said channel. He then withdraws the false bottom to be placed to another or the next hinged line-case before it is elevated with another line of dead matter.

The types stand on their feet when entering cases $i'$, and when the cases are turned to upright position and the type-faces are at the inner sides of the channels, or toward the center of the machine, as the types drop out of the channels $i$ into slots D they strike upon the pushers E and are tilted up so as to stand on their feet, and then are forced out by the pushers into the receiving type-holders $C^4$, which are supported on the skirt of casting C, as shown in Fig. 1, the upper ends of said holders fitting into enlargements $d^3$ at each side of slots D, as shown in Fig. 7, the holders forming detachable elongations of said slots. Followers $C^5$ may be used in the holders to prevent the type slipping or turning over therein. When one holder is filled, it can be removed and replaced by another, and I propose to so construct these holders that they can be inserted directly into the composing-machine reservoir and form the type-case thereof.

Two shafts with intermediate gearing are used within the cylinders I J', instead of a single shaft, to permit said cylinders to be rotated independently of disk D while the driving mechanism on plate $a$ remains stationary.

The apparatus for removing the spaces and leads from the dead matter prior to its introduction into the distributer and for loading the cases $i'$ stands beside the distributer proper, and is as follows: Upon a standard S is secured a cast frame S', on which are mounted the operative parts of the "space and lead discharger." Upon this frame is mounted a galley $S^2$, in which the matter to be distributed is placed. The type is moved forward in the galley $S^2$ by means of a plunger $S^3$, connected to cords $S^4$, which run back over pulleys $S^5$, mounted on rear-end extensions of the sides of galley, and are connected to weights $S^6$, so that there is a constant and equal tendency of the weights to move the type forward in the galley. The inner end of the galley is closed by a plate $s$, which extends both above and below the galley, and is provided on its outer face with a groove $s'$ for the accommodation of a reciprocating bar T, to which is attached a plunger T', which fits closely against the front face of plate $s$, and is of a width corresponding to the galley and is adapted to push the lines of type, as they are pressed forward in the galley against plate $s$, successively down through a slot $s^5$ in the bottom of the galley into a type-line holder W, consisting of a casting having a longitudinal channel W', adapted to receive a line of type, and secured to frame S' below and at right angles to the galley, as shown. Each time plunger T' descends, a line of type is lowered into holder W and is moved forward endwise in said holder (out of the way, prior to the descent of another line) by means of a plunger $t'$, which is reciprocated back and forth at proper times by a lever $t^2$, pivoted on a depension of the frame S' and operated by a cam $t^3$ on a stub-shaft $t^4$, underlying the galley and journaled in suitable bearings formed on or attached to frame S', as shown.

The lower end of bar T is engaged by a vibratory lever $T^2$, pivoted on a bracket $S^7$, attached to frame S' and vibrated by a cam $T^3$ on shaft $t^4$, as shown. In the front face of plate $s$, just above the floor of galley $S^2$, is a transverse slot $s^6$, in which is a stop-bar U, the ends of which are bent outward and are pivotally connected (behind plate $s$) to the bifurcations of an oscillating lever U', which is fulcrumed on a stud $s^3$, projecting from a plate $s^2$, attached to the rear face of plate $s$ and confining bar T thereto. The lower end of said lever U' engages a cam-groove in a drunken cam U², attached to the outer end of shaft $t^4$, as shown.

Figures 17, 18:
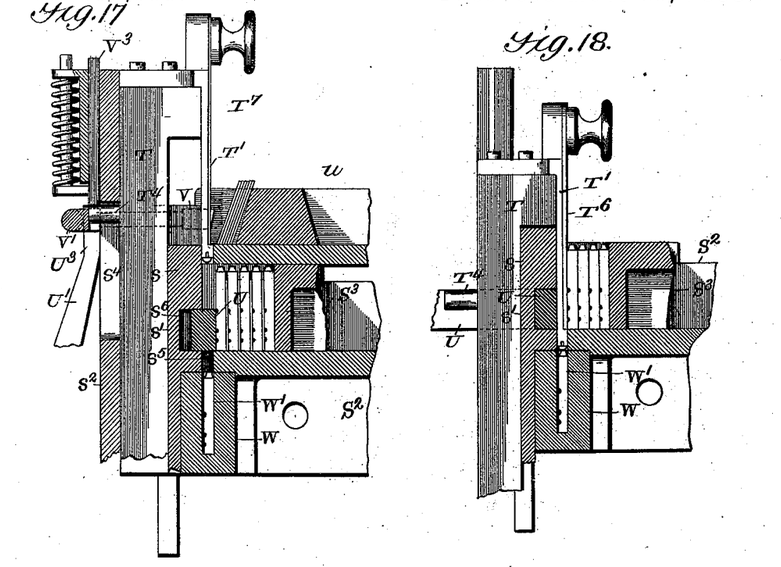
Figs. 17, 18, 19, and 20 are detail sections through the discarder, showing the lead-discarding devices and the line-separating devices.
Figure 19:
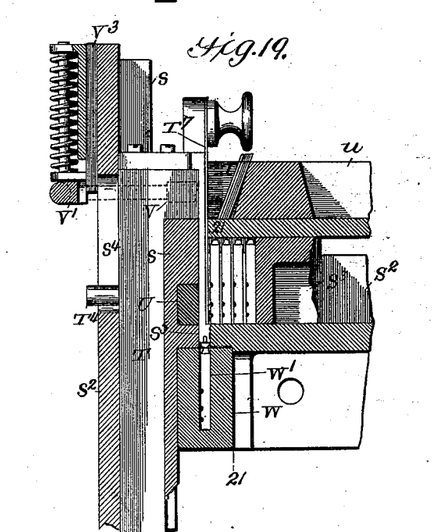

The object of stop-bar U is to prevent the dead type falling or being pushed forward over slot $s^5$ until the plunger has risen clear above the type and the previously-lowered line of type in holder $t$ has been moved out of the way. Above galley $t$ is a lead-receiver $u$, (see Figs. 17 and 19,) which also serves as a guard to prevent a line of type being pulled up with the plunger. Back of this receiver, contained in openings $s^4$ in plate $s$, are pushers V, which are connected at rear to a bar V', which lies in rear of extensions U³ of lever U', so that the bolts V will be retracted simultaneously with the retraction of stop-bar U and not hinder the descent of plunger T'. When the plunger T' reaches its uppermost position, the pushers V are projected forward by springs V², suitably arranged through openings T⁵ in the plunger, and push the leads which have been raised with the plunger off into receiver $u$.

Figure 15:
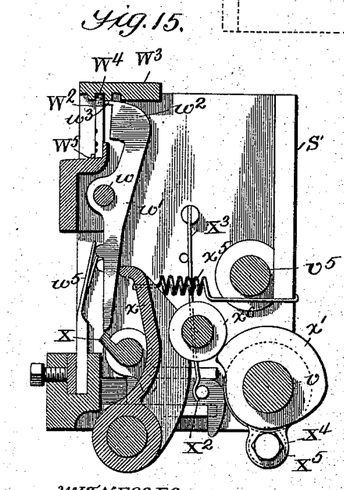
Figs. 15 and 16 are vertical sections on line 15 16, Fig. 14, showing the space-discarding mechanism in and out of operative positions.
Figure 16:
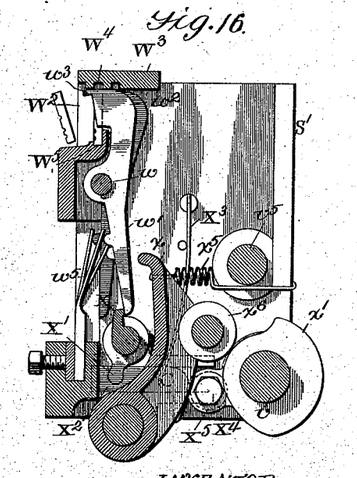

In order to prevent the pushers interfering with the operation of the plunger when they are drawn back by lever U', a spring-actuated bolt V³, guided in a groove in plate $s$, drops in front of bar V' and holds the plunger retracted independently of lever U', and the pushers are thus held out of the way until a stud T⁴ on plate T lifts the bolt out of engagement with the bar and allows the springs to project the pushers, as described. This stud T⁴ projects through a slot $s^4$ in the back of plate $s^2$, as shown. A bevel-gear $t^5$ on shaft $t^4$ meshes with a similar gear $t^6$ on a shaft $v$, journaled in frame S at right angles to shaft $t^4$, and above shaft $v$ is another shaft $v^5$, likewise journaled in frame S and having a pinion $v^6$ on its inner end meshing with a gear $v^7$ on shaft $v$, so as to transmit motion thereto. On the outer end of shaft $v^5$ is a pulley $v'$, clamped between two friction-plates $v^2$, so that in case of any untoward obstruction, such as the misplacement of a type in the machine, the pulley $v'$ will slip and breakage of parts be prevented, the friction-plates clamping the pulley sufficiently to cause it to drive shaft $v^5$ under ordinary working conditions. Pulley $v'$ is driven by a belt $v^3$ from a pulley on shaft R, as indicated in the drawings. Holder W lies parallel with, but above and in rear of, shaft $v^5$, and said holder has a lateral slot W² through it and a shallow groove W⁵ at bottom registering with channel W'. The top of this slot is formed by a plate W³ fitted on top of the holder and having a shallow groove W⁴ in its under side registering with channel W' and adapted to guide the upper ends of the types passing through said channel. Moving past slot W², therefore, the types are simply held in and guided by narrow grooves at top and bottom, as shown in Figs. 15 and 16, while the spaces $z$, being shorter than the type, are simply guided in the lower groove and can be readily knocked out.

In practice the spaces are knocked out of the type or discarded while passing slot W² by the following means: Upon a shaft $w$, just beneath slot W², are hung a series of space ejectors and feelers $w'$, (see Figs. 15 and 16,) formed of thin metal plates, about as wide as the narrowest spaces, having heads $w^2$, which lie just in front of slot W². Each head has a "feeler-tooth" $w^3$ on its upper end, which, if it strikes a type, will prevent the ejector oscillating, but if it passes between adjoining types over a lead will allow the ejector to be partly oscillated by a spring $w^5$, bearing against the depending end $w^4$ of the ejectors, (see Fig. 16,) there being a spring for each ejector. When an ejector is thus thrown backward, its lower end comes into position to be struck by a rocking plate X, journaled in frame below and in front of the ejectors, said plate having a depending finger X' engaging a notch in a slide X², which is moved in one direction by a spring X³ and forced in the other direction by a cam-roller X⁴, mounted on an arm X⁵, attached to shaft $v$, as shown. The ejectors are kept out of the way of the type in channel W', except at proper intervals, by means of a controller $x$, pivoted on frame S below plate X and curving up in front of and over said plate, having its upper end bent backward into a straight edge which contacts the front lower sides of the ejectors and pushes them rearward, so as to withdraw their heads from slot W² and keep their lower ends out of engagement with plate X and tension-springs $w^5$. This controller is held in this position by a cam $x'$ on shaft $v$, which at the proper point is constricted so as to allow the controller to be drawn away from the ejectors by a spring $x^5$, as shown. The dog-plate has a friction-roller $x^6$ to bear against cam $x'$. After passing slot W² the types enter the receivers $i'$ of the distributing-machine, being automatically freed from both leads and spaces prior to introduction into the receivers.

Figure 20:
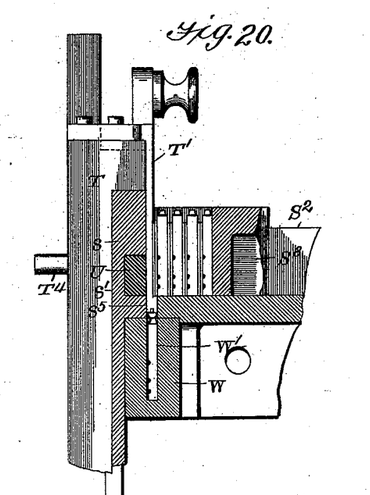
Figure 21:
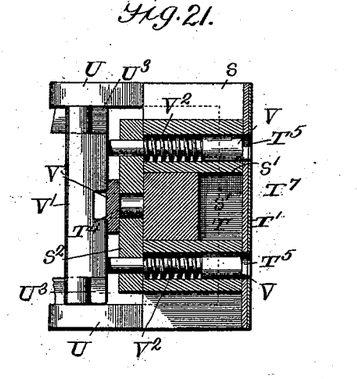
Fig. 21 is a detail transverse section on line 21 21, Fig. 19.

Operation of apparatus: The dead matter or type to be distributed is placed in galley S² in rear of follower S³, by which the matter is moved back toward plate $s$ as the rearmost lines are withdrawn. Stop-plate U being retracted, the rearmost line of type is brought over slot $s^5$ and under plunger T', which thereupon descends and forces the rearmost line of type down through slot $s'$ into the channel W' of casting W. As the plunger T' rises, plunger $t'$ in channel W' pushes the separated line of type along said channel until it is clear of slot $s^{5+}$, and as soon as plunger gets back to starting position another line of type is separated and lowered through slot $s^5$ by plunger T'. As plunger T' rises above the slot $s^5$, stop-bar U is projected and prevents the rearward movement of the dead matter until the parts are ready to separate another line therefrom, as described. When working on solid matter, a plate T⁶ should be secured to the face of plunger T' to make it uniform in thickness with the lines of type being operated on and prevent it catching any type on its upstroke. (See Fig. 18.) When working on single-leaded matter, (see Fig. 17 and 19,) a thinner plate $T^7$ is substituted for plate $T^6$, leaving a slight ledge $T^8$ on the lower edge of the plunger, which as the plunger rises will catch the lead and draw it up into box $u$, wherein it is delivered by the pushers V. For double-leaded matter, Fig. 20, no plates are used, leaving the ledge $T^8$ wide enough to draw up both leads. Of course stop-bar U and pushers V are withdrawn out of the way of the plunger prior to the descent of the latter. The types in channel W' are moved forward toward slot $W^2$, and in passing through slot $W^2$ the ejectors $w'$ knock all the spaces out of the lines, for the spaces being shorter than the types allow the points or feelers $w^3$ on the ejectors to project into the line of type in the openings over the spaces, thereby bringing the lower ends of the ejectors into such position that the rock-plate X will catch all the ejectors that have found spaces in the matter and oscillate them sufficiently to knock all the spaces out of the line, as indicated in Fig. 16. The controller $x$ is thrown forward by cam $x'$, so as to keep the ejectors away from the type-line during the operation of plunger $t'$ or while the type are being moved along in channel W', so that there will be no interference between the operative parts. Where there are no spaces, the feelers $w^3$ simply press against the upper ends of the type and remain in that position until the controller $x$ forces them away from the type. The type thus freed from leads and spaces is moved on into one of the hinged type-cases $i'$ on the distributer, the upper end of which case when turned down rests in a recess $W^7$ in discharge end of holder W and forms a continuation of channel W', so that the plunger $t'$ also leads the types into the cases. As soon as the case is filled, the lead and space discarder may be temporarily stopped until the barrel J' is rotated and another case $i'$ adjusted to receive the type from channel W'. This can be done without stopping the operation of the distributer.

From cases $i'$ the types enter channels $i$, in which they lie heads inward, which enables me to deliver the type right end up into the holders $c^4$, as above described. When any channel of the distributer is empty, the top lock $j'$ is raised and the cylinder I rotated by the operator so as to bring the case hinged over the empty channel into register with the channel W' of the space and lead-discarding mechanism, where it is refilled with type.

It will be observed that the channels in the distributing-case can be filled while the distribution is going on, which cannot be done with other circular or cylinder distributing-machines and is a great practical advantage.

All the bottom types in channels $i$ that are in register with test-plates of their own character will drop through the slots D' into the holders, separating the distributed type from the undistributed matter in the cylinder and delivering it ready for removal to the setting-machine.

The disk D, its support, the removable receivers, the pushers, and the devices for operating them are all rotated by means of the ratchet-pawl O' on arm M. After the test-plate is moved one notch by the ratchet and pawl, the friction-brake is applied, checking the momentum of the moving parts, so that the bolt L can engage a slot $j'$ and bring all the test-plates on the disk into exact register with the channels in the cylinder I.

The principal features of the invention are, first, the discarding of spaces prior to distribution of the type, which has never before been accomplished in type-distributing machines; second, the use of hinged cases for loading the type-channels; third, the novel mechanism for discarding the leads; fourth, the stationary type-holding cylinder and revolving test-plates.

Figure 22:
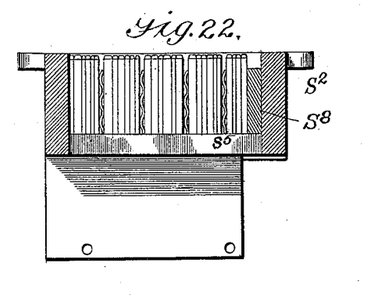
Figs. 22 and 23 are details of the galleys.
Figure 23:
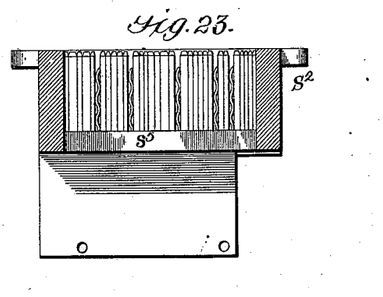

When the line of type is not as long as the width of the galley, strips, as $S^8$ in Fig. 22, may be placed in the side of galley to fill out the lines.

Having thus described my invention and in what manner the same is to be performed, I declare that what I claim as new is—

1. In a type distributing machine, the combination with means for distributing type, of means for discarding the spaces from the type, prior to its introduction into the distributing channels, substantially as described.

2. In a type distributing machine, the combination with mechanism for discarding spaces from a line of type, with means for feeding type lines to said mechanism, substantially as described.

3. In a type distributing machine, the combination of means for separating lines of type from dead matter, with mechanism for knocking the spaces out of the separated type lines, substantially as described.

4. The combination of type distributing mechanism; and means for separating lines of type from dead matter, with mechanism for separating the spaces from the types prior to the introduction of the type into the distributing mechanism, substantially as described.

5. The combination with mechanism for separating lines of type from dead matter, and for discarding the leads therein, with mechanism whereby the spaces are discarded from the separated lines, substantially as and for the purpose described.

6. The combination of a type distributing mechanism, a dead matter galley, means for removing the leads and separating lines of type from the dead matter; and mechanism whereby the spaces are discarded from the type after they are taken from the galley but prior to their introduction into the distributing mechanism, substantially as described.

7. The combination of a channeled holder through which lines of composed types are passed, with mechanism, substantially as described, whereby the spaces in the lines of type are simultaneously discarded or removed from the type before they leave the holder, substantially as described.

8. In a type distributing machine the combination of a type-holder having a series of vertical type holding channels, with a rotary series of test plates located below the holder, and means for moving said test-plates successively beneath the channels of the holder, substantially as described.

9. In a type distributing machine the combination of a cylindrical channeled type holder, a series of test plates moving successively under the channels of the holder, and a series of type reservoirs or holders below and moving with the test plates, substantially as and for the purpose set forth.

10. In a type distributing machine the combination of a cylinder having a series of type holding channels, a disk having a slot for each channel and a test plate in each slot rotating beneath said cylinder, and a series of type receivers or holders below, and moving with, the test plates, substantially as described.

11. In a type distributing machine the combination of a series of type holding channels, a series of test plates for separating the types, holders into which the distributed types are delivered, and pushers below the test plates adapted to forward the distributed types into the holders, substantially as described.

12. In a type distributing machine the combination of a channeled type holder, a series of test-plates moving successively under the channels of the holder, and a series of type reservoirs or holders below and moving with the test plates, with a series of pushers below the test plates for forwarding the types into the holders, substantially as described.

13. In a type distributing machine the combination of a cylinder having a series of type holding channels, a disk having a slot for each channel and a test plate in each slot rotating beneath said cylinder, and a series of type receivers or holders below, and moving with, the test plates; with a series of pushers for moving the distributed types into the holders, substantially as described.

14. The combination of the cylinder having vertical type holding channels, the rotatable disk below said cylinder having slots corresponding to the channels in the cylinder, and a type test plate at each slot, means for rotating said disk and holders into which the distributed types are delivered, substantially as described.

15. In a type distributing machine the combination of a series of type holding channels, with a series of filling cases hinged to the upper ends of the channels and mechanism for filling said cases with type when lowered, substantially as described.

16. In a type distributing machine, the combination of the type holding channels, substantially as described; with a hinged type-holding case at the upper end of each channel, adapted to be lowered to receive a line of type, and when raised to deliver the lines into the channels; and means for loading said case when lowered, substantially as and for the purpose described.

17. In a continuously operating type distributing machine substantially as described, the combination of a rotatable cylinder having a series of type holding channels; with type-cases hinged to the upper ends of the channels; whereby the cylinder can be stopped and the channels filled without stopping the distributing operation of the machine, substantially as described.

18. In a type distributing machine the combination of the cylinder having a series of type holding channels, the rotatable disk underlying said cylinder having slots and test plates adapted to successively register with the channels of the cylinder; holders, rotating with said disk, into which the types are delivered as distributed; the pushers for directing the types into said holders, and the plate, rotating with the disk, but vertically movable, whereby said pushers are simultaneously vibrated; with means whereby the disk is intermittently rotated, and means whereby said plate is raised and lowered, substantially as described.

19. The combination of the cylinder having a series of type holding channels, a disk carrying test plates rotating beneath the cylinder; an annular ratchet on the said disk, and a shaft journaled with said cylinder, above the disk; with the pawl operated by said shaft, engaging said ratchet; the bolt for locking the disk and cylinder together, and the cam on said shaft for operating said bolt, substantially as and for the purpose described.

20. The combination of the cylinder having a series of type holding channels, a disk carrying test plates rotating beneath the cylinder; an annular ratchet on the said disk, and a shaft journaled within said cylinder, above the disk; with the pawl operated by said shaft, engaging said ratchet; the bolt for locking the disk and cylinder together, the cam on said shaft for operating said bolt, the brake operated from another cam on said shaft for arresting momentum of the parts; and means for rotating said shaft, substantially as described.

21. The combination of the channeled type-holding cylinder, the disk carrying test plates rotating beneath said cylinder, the shaft journaled in and movable with said cylinder, and means for imparting intermittent motion to said disk from said shaft; with the stationary vertical shaft above the first shaft, the gearing between said stationary and movable shafts, and the driving mechanism supported on a plate closing the upper end of cylinder, all substantially as described.

22. The combination in a type distributing machine, of a cylinder having a series of type holding channels, and rotatably mounted on a support; a type-case hinged to the top of each channel, adapted to be lowered to receive a line of type; means for filling the cases when lowered and means for locking said cylinder to prevent casual rotation thereof, substantially as and for the purpose described.

23. The combination in a continuously operating type distributing machine, substantially as described, of a cylinder having a series of type holding channels, and rotatably mounted on a support; a type-case hinged to the top of each channel, adapted to be lowered to receive a line of type; and means for filling said cases when lowered, substantially as and for the purpose described.

24. The combination of the type holding cylinder rotatably mounted on a central support, a shaft journaled in the heads of the cylinder at one side of the support; a pinion on the upper end of said shaft meshing with a gear on the support; a second shaft journaled in fixed bearings on the support, but within the cylinder, having a pinion on its lower end meshing with said gear; and means exterior to the cylinder, for driving said second shaft; with the rotatable disk carrying test plates, mounted on said support below the cylinder; and mechanism substantially as described for rotating and locking said disk in relation to said cylinder, operated from the lower shaft, all substantially as described.

25. The combination of the type holding cylinder rotatably mounted on a central support, a shaft journaled in the heads of the cylinder at one side of the support, a pinion on the upper end of said shaft meshing with a gear on the support; a second shaft journaled in fixed bearings on the support, but within the cylinder, having a pinion on its lower end meshing with said gear, and means exterior to the cylinder, for driving said second shaft; with the rotatable disk carrying test plates, mounted on said support below the cylinder; mechanism substantially as described for rotating and locking said disk in relation to said cylinder operated from the lower shaft; and the rotatable support below the disk carrying type holders into which the distributed type is delivered, substantially as and for the purpose set forth.

26. The combination of a galley, to receive dead matter; a holder to receive lines of type from the galley, and means for transferring lines of type from the galley to the holder; with means for forwarding the lines of type in the holder, and mechanism for ejecting the spaces from the type in the holder, substantially as described.

27. The combination of a galley having a slot near one end thereof, a plunger adapted to push a line of type through said slot, and a holder to receive the line of type from said slot, a plunger for moving the lines of type forward in said holder, and means for ejecting the spaces from the type as they pass along the holder, substantially as described.

28. The combination of a galley, a lead case above the same, and a type line holder below the galley; with a plunger adapted to transfer lines of type into the holder, and the leads into the lead case, and pushers for moving the leads off the plunger into the case, substantially as described.

29. The combination of a galley having a slot near one end for the passage of a line of type; a type line holder below said slot; and a "lead" case above the galley adapted to prevent upward movement or displacement of lines of type in the galley; with a plunger adapted to depress a line of type through the slot into the holder; and to raise the leads into the lead-case, substantially as and for the purpose described.

30. The combination of a galley having a slot near one end for the passage of a line of type; a type line holder below said slot; and a "lead" case above the galley; with a plunger adapted to depress a line of type through the slot into the holder; and to raise the leads into the lead-case, spring projected pushers adapted to knock the leads off the plunger into the lead-case, and means for retracting said pushers, substantially as and for the purpose described.

31. The combination of the galley to receive dead matter; a holder to receive lines of type from the galley, and a plunger adapted to move lines of type successively into said holder as it moves in one direction and to eject the leads from the type as it moves back; with means for forwarding the lines of type in the holder and mechanism for ejecting the spaces from the type in the holder, substantially as described.

32. The combination of a type-line holder, a series of space ejectors beside the holder having "feelers" on their ends adapted to press against the type in the holder; means for positively rocking any ejector whose "feeler" finds a space, and means for holding said ejectors out of the way of the type, while the latter is moving in the holder, substantially as set forth.

33. The combination of a type-line holder, a series of space-ejectors, springs for pressing said ejectors against the type, a controller for holding the ejectors away from the type except at the moment of their operation, and a rocking plate adapted to actuate any ejector which has found a "space" and cause it to eject such space, substantially as described.

34. The combination of a type line holder, having a slot across which the lines of type pass; ejectors beside said slot adapted to detect and eject spaces in the lines of type and mechanism for operating said ejectors, substantially as and for the purpose specified.

35. The combination of a type line holder having a slot across which the lines of type pass; spring controlled space-ejectors-and-detectors pivoted beside said slot and adapted to bear against the types passing therethrough; a controller adapted to keep the ejectors out of contact with the types when the latter are moved in the holder; and a rocking plate adapted to engage and forcibly oscillate any ejector which has found a space, and cause it to eject such space, substantially as described.

36. The combination of the slotted type-line holder, the series of detector-ejectors pivoted beside the slot in the holder and adapted to press against the type therein, the springs pressing against said ejectors, the rocking plate adapted to actuate any ejector which finds a "space," a driven shaft, and means for intermittently rocking said plate from said shaft, substantially as described.

37. The combination of the slotted type-line holder, the series of detector-ejectors pivoted beside the slot in the holder and adapted to press against the type therein, the springs pressing against said ejectors, the rocking plate adapted to actuate any ejector which finds a "space," a driven shaft, and means for intermittently rocking said plate from said shaft; with a controller plate adapted to keep the detectors out of engagement with the type or rock-plate, a spring for retracting said controller, and a cam on said shaft adapted to normally keep it in engagement with the ejectors, substantially as described.

38. The combination of a galley having a slot at one end; a reciprocating plunger above said slot, adapted to depress lines of type therethrough, having a lip on its lower edge adapted to lift leads from the type; pushers for ejecting the leads from the plunger when raised clear of the type, the springs for projecting said pushers; a cam and lever for retracting them; a spring bolt for locking the pushers when retracted; and a stud on the plunger operating bar adapted to release said bolt at the proper time, substantially as and for the purpose specified.

39. The combination of a galley having a slot near one end, and means for moving type forward in said galley; a holder beneath said slot adapted to receive lines of type from the galley; a plunger for lowering lines of type successively into the holder, and a stop bar adapted to prevent the forward movement of the type in the galley until the plunger rises above the type therein, for the purpose and substantially as described.

40. The combination of a galley having a slot near one end, and means for moving type forward in said galley; a holder beneath said slot adapted to receive lines of type from the galley; a plunger for lowering lines of type successively into the holder; a stop bar adapted to prevent the forward movement of the type in the galley until the plunger rises above the type therein; means for forwarding type in the holder, and mechanism for ejecting the spaces from the type in the holder, all substantially as described.

41. The combination of a distributing machine having a series of type channels, and a hinged type case over each channel; with mechanism for separating type from dead matter and forwarding the type lines into said cases, as required, substantially as and for the purpose described.

42. The combination of a distributing machine having a series of type channels, and a hinged type case over each channel; with mechanism for separating type from dead matter and forwarding the type lines into said cases, as required, and mechanism for ejecting the spaces from the type before they enter the cases, substantially as and for the purpose set forth.

43. The combination of the type channels, and the type cases into which the type to be distributed is loaded with a detachable false bottom applicable to the cases, and detachable therefrom to lower the type therein into the type channels, substantially as and for the purpose described.

44. The combination of the type channels, and the type cases hinged to the channels; with the detachable false bottom composed of the pieces $i^3$ and $i^4$, and spring $i^7$, substantially as and for the purpose set forth.

45. In a type distributing machine, the combination of a series of type holding channels, a series of type holding cases hinged to the upper ends of the channels, and means for distributing the type from the channels, substantially as and for the purpose described.

In testimony that I claim the foregoing as my own I affix my signature in presence of two witnesses.

PAUL FLEMMING COX.

Witnesses:
A. M. BARNHART,
H. C. LEWIS.